US010969227B2

(12) United States Patent
Miller

(10) Patent No.: US 10,969,227 B2
(45) Date of Patent: Apr. 6, 2021

(54) DISPLAY OF AIRCRAFT TIME ON TARGET ON MOBILE DEVICES

(71) Applicant: The Boeing Company, Houston, TX (US)

(72) Inventor: Jason Miller, Austin, TX (US)

(73) Assignee: The Boeing Company, Houston, TX (US)

( * ) Notice: Subject to any disclaimer, the term of this patent is extended or adjusted under 35 U.S.C. 154(b) by 0 days.

(21) Appl. No.: 16/536,466

(22) Filed: Aug. 9, 2019

(65) Prior Publication Data

US 2021/0041242 A1    Feb. 11, 2021

(51) Int. Cl.
| | | |
|---|---|---|
| *G01C 21/20* | (2006.01) | |
| *G06F 3/0482* | (2013.01) | |
| *G06F 3/0485* | (2013.01) | |
| *G05D 1/10* | (2006.01) | |
| *G06F 3/0484* | (2013.01) | |

(52) U.S. Cl.
CPC ............ *G01C 21/20* (2013.01); *G05D 1/1062* (2019.05); *G06F 3/0482* (2013.01); *G06F 3/0485* (2013.01); *G06F 3/04847* (2013.01); *G06F 2203/04803* (2013.01)

(58) Field of Classification Search
CPC .. G06F 3/0482; G06F 3/04847; G06F 3/0485; G06F 2203/04803; G01C 21/20; G05D 1/1062
See application file for complete search history.

(56) References Cited

U.S. PATENT DOCUMENTS

| | | | | |
|---|---|---|---|---|
| 9,132,913 | B1* | 9/2015 | Shapiro | ................ G08G 5/0086 |
| 9,256,761 | B1* | 2/2016 | Sahu | ................ G06F 16/90335 |
| 10,102,756 | B2* | 10/2018 | Burke | ................ G08G 5/0021 |
| 2007/0150123 | A1* | 6/2007 | Combs | ................ G08G 5/0052 |
| | | | | 701/3 |
| 2013/0204523 | A1* | 8/2013 | He | ................ G01C 23/005 |
| | | | | 701/527 |
| 2014/0278069 | A1* | 9/2014 | Passinger | ............. G08G 5/0052 |
| | | | | 701/465 |
| 2015/0239574 | A1* | 8/2015 | Ball | ...................... B64D 45/00 |
| | | | | 701/3 |
| 2016/0093217 | A1* | 3/2016 | Hale | .................... G08G 5/0021 |
| | | | | 701/120 |
| 2016/0093218 | A1* | 3/2016 | Hale | .................... G08G 5/0039 |
| | | | | 701/120 |

(Continued)

*Primary Examiner* — Tadesse Hailu
(74) *Attorney, Agent, or Firm* — Ferguson Braswell Fraser Kubasta PC

(57) ABSTRACT

A method of displaying, on a screen of a mobile device, time on target information for an aircraft in flight. The method includes displaying a current location of the aircraft on a map, a waypoint between a departure point and a destination point, a symbol indicating the waypoint in a first area of the screen overlapping the map, and a first pop-up window in a second area of the screen overlapping the first area. The first pop-up window displays a current arrival time at the waypoint and an input area to receive an adjustment to the current arrival time. Responsive to receiving the input, second pop-up window in a third area of the screen displays a recommendation to perform a speed change to achieve the adjustment, and a second recommendation that indicates a numerical value of a recommended speed change to achieve the adjustment.

20 Claims, 9 Drawing Sheets

(56) References Cited

U.S. PATENT DOCUMENTS

| | | | |
|---|---|---|---|
| 2016/0125742 A1* | 5/2016 | Shorter, Jr. | G08G 5/0043 |
| | | | 701/528 |
| 2016/0343258 A1* | 11/2016 | Navarro | G08G 5/0052 |
| 2017/0046962 A1* | 2/2017 | Shipley | G08G 5/0013 |
| 2017/0250930 A1* | 8/2017 | Ben-Itzhak | G06F 3/011 |
| 2018/0014062 A1* | 1/2018 | Turi | H04N 21/4782 |
| 2018/0059875 A1* | 3/2018 | Siegelmann | G06F 3/0481 |
| 2020/0168104 A1* | 5/2020 | Holder | G01C 23/005 |
| 2020/0379488 A1* | 12/2020 | Thirumalaivenjamur | |
| | | | B64C 30/00 |

* cited by examiner

DISPLAY OF AIRCRAFT TIME ON TARGET ON MOBILE DEVICES

BACKGROUND

Various governmental organizations throughout the world regulate flight planning. In the United States of America, the Federal Aviation Administration (FAA) regulates flight planning. As used herein, such governmental organizations are referred to as "regulators."

In many cases, regulators require aircraft operators to submit a flight plan for each flight of an aircraft. The flight plan indicates, among possible other information, the point of departure, the point of destination, and waypoints along the route, together with planned times of arrival at each waypoint. To better control air traffic in a given region, the regulators may require an aircraft operator to arrive at certain waypoints along the flight plan at certain precise times. The required timing of aircraft arrival at a waypoint may require the aircraft operator to adjust the speed of the aircraft, the trajectory of the aircraft, or both.

In other cases, a pilot may wish to reach a reconnaissance target at a certain coordinated time, perform a stadium flyover for a sporting event, or possibly arrive at a target at a specific time for many other reasons. Thus, again, a user may wish to adjust the course or speed of an aircraft, or both, in order to arrive at a waypoint or a destination at a specific time.

SUMMARY

In general, in one aspect, one or more embodiments relate to a method of displaying, on a screen of a mobile device, time on target information for an aircraft in flight. The method includes displaying, on the screen of the mobile device, a map of a portion of Earth including a plurality of ground locations. The method also includes displaying, on the map, a current location of the aircraft. The method also includes displaying, on the map, a waypoint for a planned flight path of the aircraft between a departure point and a destination point. The method also includes displaying, in a first area of the screen overlapping the map, a symbol indicating the waypoint. The method also includes displaying, responsive to a selection of the symbol, a first pop-up window in a second area of the screen overlapping the first area of the screen. The first pop-up window displays a current time of arrival of the aircraft at the waypoint and further displays an input area configured to receive an input indicating an adjustment to the current time of arrival. The method also includes displaying, responsive to receiving the input, a second pop-up window overlying the map in a third area of the screen. The second pop-up window displays a recommendation to perform one of: increase speed, maintain speed, and decrease speed to achieve the adjustment, and wherein the second pop-up window further displays a second recommendation that indicates a numerical value of a recommended speed change for the aircraft to achieve the adjustment.

In another aspect, one or more embodiments relate to a method of displaying, on a screen of a mobile device, a course adjustment to an aircraft. The method includes receiving, by the mobile device and in an input area of a pop-up window overlaying a map that displays a current location of the aircraft in flight, an adjustment to a current time of arrival of the aircraft at a waypoint displayed in the pop-up window. The method also includes displaying a desired adjusted time of arrival in the pop-up window based on the adjustment. The method also includes receiving, in the mobile device, predicted flight conditions expected to occur before the aircraft reaches the waypoint. The method also includes calculating, using the predicted flight conditions, an adjusted course effective to arrive at the waypoint at the desired adjusted time of arrival. The method also includes displaying the adjusted course.

In another aspect, one or more embodiments relate to a non-transitory computer readable storage medium including computer readable program code, the computer readable program code for causing a computer system to implement a method of displaying, on a screen connected to a computing device, a course adjustment to an aircraft. The computer readable program code is for further causing the computer system to receive, by the computing device and in an input area of a pop-up window overlying a map that displays a current location of the aircraft in flight, an adjustment to a current time of arrival of the aircraft at a waypoint displayed in the pop-up window. The computer readable program code is for further causing the computer system to display a desired adjusted time of arrival in the pop-up window based on the adjustment. The computer readable program code is for further causing the computer system to receive, in the computing device, predicted flight conditions expected to occur before the aircraft reaches the waypoint. The computer readable program code is for further causing the computer system to calculate, using the predicted flight conditions, an adjusted course effective to arrive at the waypoint at the desired adjusted time of arrival. The computer readable program code is for further causing the computer system to display the adjusted course.

Other aspects of the invention will be apparent from the following description and the appended claims.

DETAILED DESCRIPTION

Figure 1:
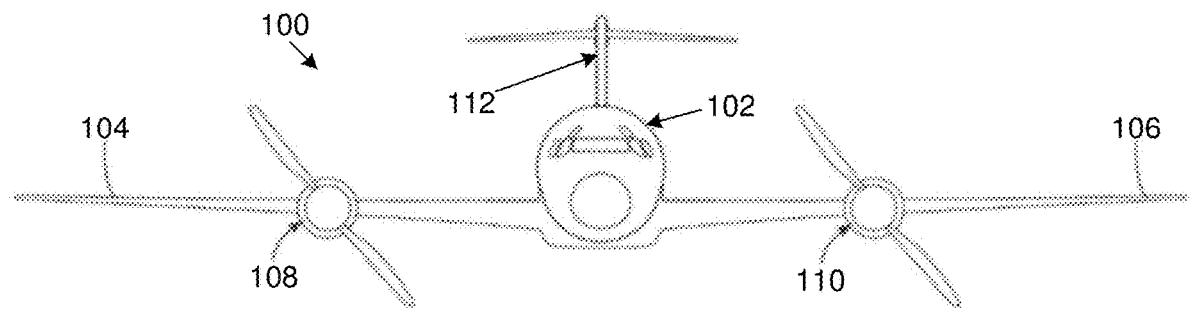
FIG. 1 shows an aircraft, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The one or more embodiments generally relate to improved methods of displaying information on mobile devices with limited screen space. In the context of displaying aircraft flight information on mobile devices, the one or more embodiments recognize that mobile devices with limited screen space have difficulty in meaningfully displaying all of: a map showing a position of the aircraft relative to ground positions, time on target information, a user interface (UI) large enough to receive a touch-based user input to a change to time on target information, and a display of the effect of the change to time on target information. The one or more embodiments address this challenge by using a series of UI overlays over a map displayed on the mobile device, as described below and shown in the figures.

The one or more embodiments also generally relate to improved methods of calculating a time on target for an aircraft in flight using a mobile device disconnected from the aircraft. As used herein, the term "time on target" refers to the projected time at which an aircraft is expected to arrive at a waypoint or at a destination point. The one or more embodiments recognize that current mobile devices do not provide sufficiently accurate time on target information for an aircraft in flight. In particular, the time on target for the aircraft will be influenced by weather conditions along the path of the target, as well as changes to aircraft speed required during ascent and decent, neither of which are currently accounted for in mobile device calculations used to determine the time to target.

FIG. 1 shows an aircraft in one or more embodiments. The aircraft (100) shown in FIG. 1 may be the aircraft in flight for which changing time on target information is to be determined and displayed, as described with respect to FIG. 2 through FIG. 9. Aircraft (100) at least includes a fuselage (102). The aircraft (100) may include other features, depending on the aircraft type (glider, flying wing, rotor craft, jet craft, prop craft, etc.).

For example, the aircraft (100) may include one or more wings, such as a first wing (104) and a second wing (106). The aircraft may include a propulsion system, such as a first engine (108) and a second engine (110), which are connected to the fuselage (102) or to one or both wings (104, 106). In the example shown, the engines are propeller-based engines; however, the engines may be jet engines or other types of engines. The aircraft may also include a tail (112). Many other features may be provided on or in the aircraft.

Figure 2:
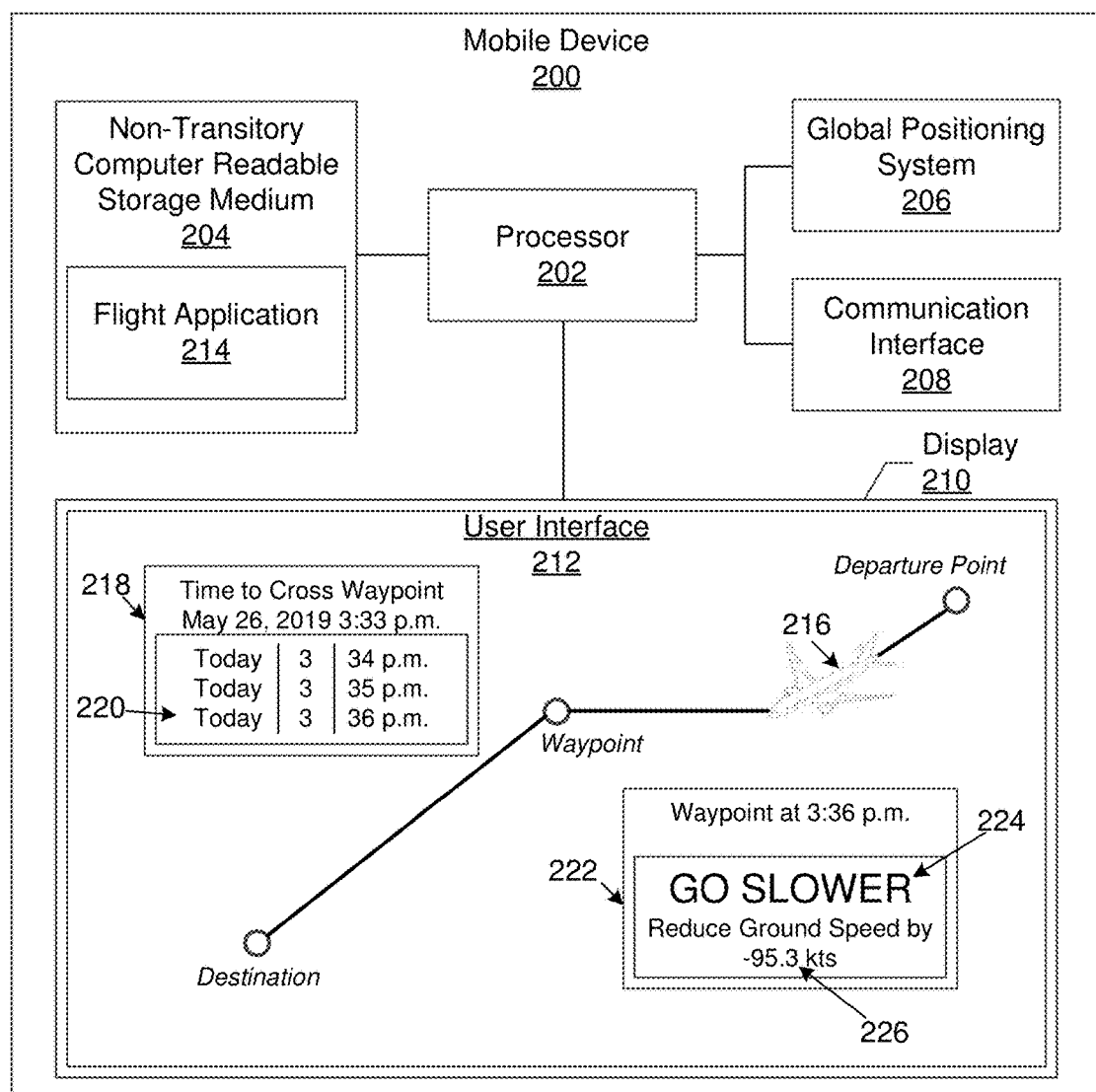
FIG. 2 shows a mobile device, in accordance with one or more embodiments.

FIG. 2 shows a mobile device, in accordance with one or more embodiments. Mobile device (200) is a handheld computer, mobile phone, tablet computer, laptop computer, or other hand portable electronic device with the components described herein. The mobile device (200) is distinguished from a relatively non-mobile device, such as a desktop computer, a mainframe computer, or a computer installed on an aircraft. As used herein, a "mobile device" is separate from and not integrated with any computing system installed on the aircraft.

Mobile device (200) is a system that includes a processor (202) in communication with a non-transitory computer readable storage medium (204), a global positioning system (206) (GPS), a communication interface (208), and a display (210). The processor (202) commands the display (210) to show a user interface (212).

The processor (202) may execute instructions stored on the non-transitory computer readable storage medium (204). The instructions may take the form, in part, of a flight application (214). The flight application (214) is software which, when executed by the processor (202), generates information useful for displaying the user interface (212) on the display (210). Use of the user interface (212) is described with respect to FIG. 3 and FIG. 4. Examples of user interfaces generated by the flight application (214) are shown in FIG. 5 through FIG. 9.

The non-transitory computer readable storage medium (204) also stores information necessary for the planning of a time on target that involves a flight. The information in the non-transitory computer readable storage medium (204) may include but is not limited to maps, airport information, flight conditions (including weather, restrictions, delays, etc.) and aircraft information (including performance data). The non-transitory computer readable storage medium (204) is local, e.g., stored on a hard drive or in flash memory that are part of the mobile device (200). However, information stored on the non-transitory computer readable storage medium (204) may be downloaded from externals sources via communication interface (208). An example of the non-transitory computer readable storage medium (204) may be non-persistent storage device(s) (1004) or persistent storage device(s) (1006), shown in FIG. 10A.

The display (210) may be a screen, such as a liquid crystal display (LCD), light emitting diode (LED) or organic LED (OLED) screen or any other type of display that supports visual content to be shown to a user. Specialized display technologies or accessories may further be used, e.g., screens that are customized for nighttime use. The display may be used as the output interface to a user (e.g. a pilot) and may display content related to a trip being planned, such as maps, text describing the trip, etc. Some of the displayed content may be editable to enable the user to build or edit a trip. The display (210) may also be a touch display configured to receive user input directly by the user touching the display (210).

The user interface (212) may accommodate any content associated with a trip, including input fields for entering content describing the trip or changes to a desired time on target, and/or output elements for displaying content describing the trip or showing instructions for arriving at the desired time on target. Input elements may be on-screen drop-down menus, checkboxes, free-text fields, etc. The input elements may be configured to receive information including, but not limited to, departure and destination locations, departure and destination airports, a desired departure or arrival time, a selection of an aircraft to be used along with aircraft specifications including the selected cruise profile, passenger data, a fuel loading scheme, etc. The output elements may include text and/or graphics intended to inform the user about the configuration of the trip being planned. Displayed information about the trip may include, but is not limited to, possible departure and/or destination airports from which the user may choose, possible fuel stops from which the user may choose, a map visualization of the drive from a departure location to a departure airport, and/or from a destination airport to a destination location, a map visualization of the planned flight from the departure airport to the destination airport, a timeline for the trip, etc.

In one or more embodiments, the user interface is interactive. A user may make selections to refine a time on target for the aircraft using the input elements of the user interface. In response to the user's selections, the output elements of the user interface are updated to inform the user about the course or speed changes needed for the aircraft to arrive at the desired time on target. The user may choose to modify the trip or the time on target until satisfied with the planned trip or time on target.

The global positioning system (206), in accordance with one or more embodiments, includes a hardware sensor configured to determine a current location of the mobile device, and hence aircraft, using the global positioning satellite system (GPS). The sensor may be a sensor built into the mobile device (200). Alternatively, the global positioning system (206) may obtain GPS information from another source, such as the aircraft, via the communication interface (208) or an external sensor that may be installed on the aircraft.

The communication interface (208), in accordance with one or more embodiments, includes software and hardware components that perform communication operations for the mobile device (200) to communicate with other computing devices such as remote servers, cloud-based services, etc. The communication interface may be any kind of wired or wireless network interface, including an interface that may communicate with satellites. In one or more embodiments, aviation data that changes frequently, e.g., information about winds aloft, weather phenomena, airspace congestion, and/or fueling information, etc., is obtained via the communication interface (208). An example of the communication interface (208) may be communication interface (1008) of FIG. 10A.

As indicated above, the flight application (214) may be software which is useful for performing computer calculations necessary to display the information in the user interface (212). However, the flight application (214) may also take the form of hardware (e.g., an application specific integrated circuit (ASIC)) or a combination of hardware and software.

In particular, the flight application (214) is configured, when executed by the processor (202), to cause the display (210) to show a map including a departure point, a waypoint, and a destination point. As used herein, a map is a diagrammatic representation of an area showing geographic features, whereby the distances between the geographic features on the map are equal to a scaled estimation of the actual distances between the geographic features. The map may show other features of interest on the ground. The map may also show a current location of the aircraft (216) in flight.

The map may be displayed with various layers of additional information superimposed. For example, the map may be a sectional chart with visual flight rules (VFR) data and/or weather information superimposed. The map may be shown at a desired zoom level and may be customized based on user preferences. For example, a user-selected color coding or brightness level may be used. The map may be associated with a map reference frame. A map reference frame is a coordinate system of the map, such as but not limited to latitude and longitude.

The flight application (214) is also configured, when executed by the processor (202) to cause the display (210) to show a first area (218) that overlays the map. The first area (218) shows a current time on target for the aircraft based on the aircraft's current course and speed. The first area (218) may also display the altitude and speed of the aircraft.

Figure 8:

The term "overlay" means that an object is displayed on the screen over the map. In an embodiment, the underlying map may be draggable so that different areas of the map may be brought into view while still displaying the overlaid portions which remain in a fixed position with respect to the display screen of the mobile device. An overlay may be opaque, in which case underlying icons and shapes of the map or intervening overlays cannot be seen behind the overlay. An overlay may be at least partially transparent, in which case at least some of the underlying icons and shapes of the map or intervening overlays can be seen behind the overlay. In one or more embodiments, overlays may all be transparent, may all be opaque, or may be a mix of transparent and opaque (e.g., as shown in FIG. 8).

The first area (218) also includes a user input area (220). The user input area (220) may show times which the user may select to input a change to the desired time on target for the aircraft. In the example shown in FIG. 2, a user may use a touch screen interface to interact with three separate scroll wheels. The first scroll wheel is used to select a change to the current date, which may be reported as "today," "yesterday," or "tomorrow," or which may be reported as the actual date. The second scroll wheel is used to select a change to the current hour. The third scroll wheel is used to select a change to the current minute. An optional fourth scroll wheel is used to select "a.m." and "p.m." in the case that a twelve hour clock is being displayed and used.

The flight application (214) is also configured, when executed by the processor (202) to cause the display (210) to show a second area (222) that overlays the map. The second area (222) shows the desired time on target that the user selected in the user input area (220). The second area (222) also shows a simplified, prominent instruction to change speed or alter course, shown at first output (224) along with a more specific instruction, shown at second output (226). As used herein, the term "simplified" means more succinct or more abstract instruction relative to the more specific instruction shown at the second output (226). As used herein, the term "prominent" means highlighted or displayed in a larger font size relative to the more specific instruction shown at the second output (226).

For example, the simplified instruction may be to "go slower" and the more specific instruction may be a change in speed that the user should apply to the aircraft in flight. In an embodiment, if the desired time on target is not attainable by the aircraft (i.e. the aircraft cannot fly fast enough or slow enough in view of any course to achieve the desired time on target), then the second output (226) may indicate an error condition.

Note that while a change in speed is shown in FIG. 1, a change in course is also contemplated as a possible way to alter the time in target. For example, the map may be updated to show a new waypoint or set of multiple waypoints, possibly in three dimensional space, such that the desired time on target will be achieved. The user can use that information to adjust the course and/or speed of the aircraft to arrive at the waypoint or the destination point at the desired time on target.

In addition, the flight application (214) may include instructions to take into account more than just speed and distance traveled when calculating a projected time on target. For example, the flight application (214) may include instructions to take into account other information stored on the non-transitory computer readable storage medium (204) or obtained via the communication interface (208) when calculating a projected time on target. In particular, the flight application (214) may include instructions to factor in additional speed changes necessary to overcome flight conditions expected to be encountered along the projected flight path, such as winds aloft, temperature changes, or storms. The flight application (214) may include instructions to factor in additional course changes necessary to avoid undesirable flight conditions, such as severe weather. The flight application (214) may include instructions to factor in speed or course changes expected to be performed during ascent or descent of the aircraft at points along the projected flight path prior to or when arriving at the waypoint or the destination point.

Figure 3:
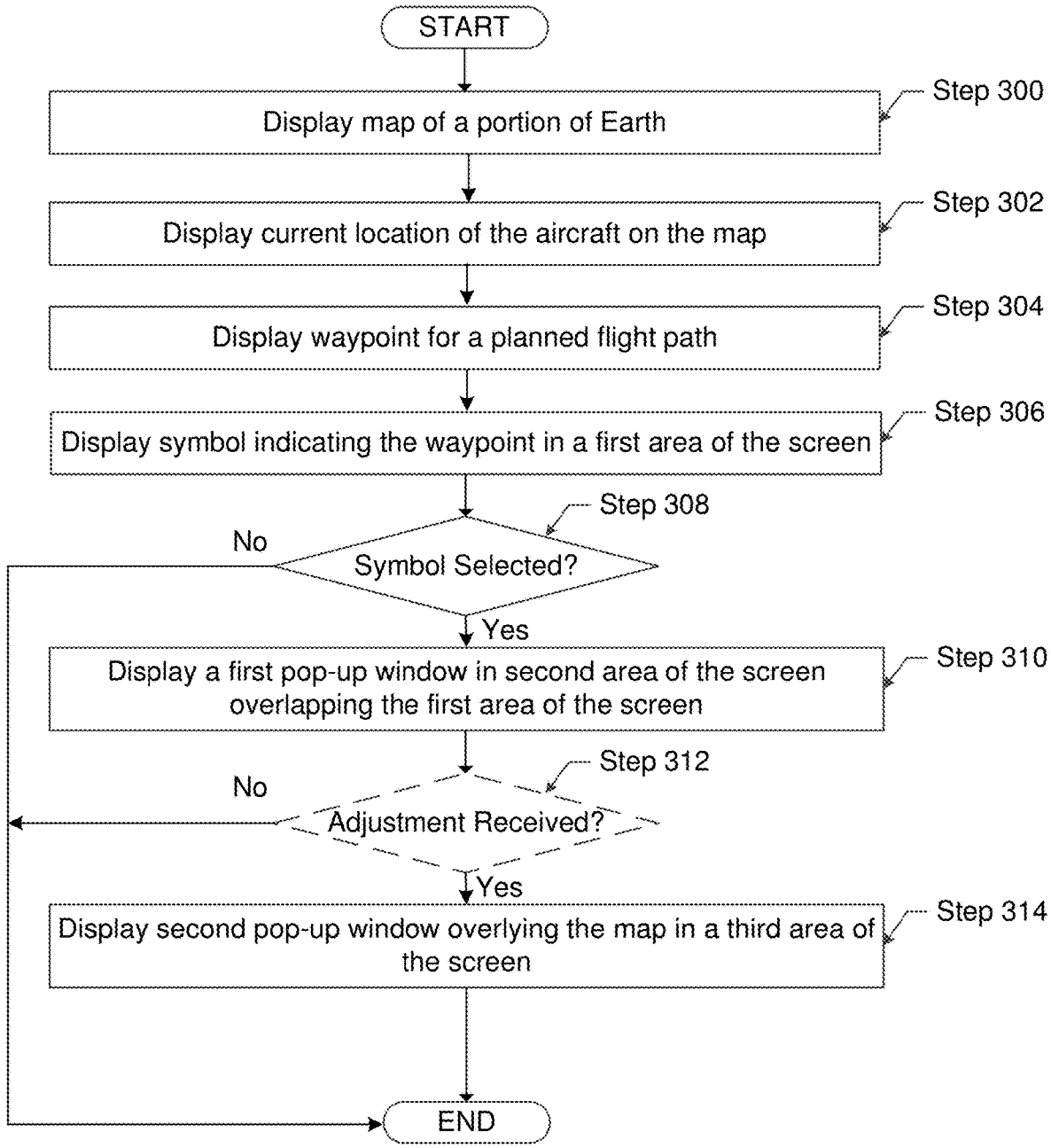
FIG. 3 and FIG. 4 show flowcharts, in accordance with one or more embodiments.

FIG. 3 shows a flowchart, in accordance with one or more embodiments. The method shown in FIG. 3 may be executed by a mobile device using a flight application, such as mobile device (200) and flight application (214) shown in FIG. 2. The method shown in FIG. 3 may also be executed by the devices shown in FIG. 10A and FIG. 10B. The method shown in FIG. 3 may be characterized as a method of displaying, on a screen of a mobile device, time on target information for an aircraft in flight.

At step 300, a map of a portion of Earth is displayed on the screen of the mobile device. The map may show one or more ground locations. The map may show a departure point, a destination point, a path of the aircraft between points, and other information such as but not limited to airports located within the portion displayed.

At step 302, a current location of the aircraft is displayed on the map. The current location may be displayed as an icon representing the aircraft, as indicated in FIG. 2 and FIG. 5 through FIG. 9.

In addition, one or more rings may be drawn around the aircraft. If multiple rings are present, the rings may be concentric. Each ring may be labeled with a projected future time at which the aircraft will arrive at location on the map given the aircraft's current speed. In other words, a ring may be drawn at a distance from the aircraft such that the aircraft will arrive at a point located on the ring within a pre-defined amount of time in the future. Examples of such rings are shown in FIG. 5 through FIG. 9.

At step 304, a waypoint may be displayed on the map for a planned flight path of the aircraft between a departure point and a destination point. The waypoint may be provided by the user, or may be supplied as part of a flight plan required by a third party, such as a regulatory body. Examples of waypoints are shown in FIG. 2 and FIG. 5 through FIG. 9.

At step 306, a symbol indicating the waypoint is displayed in a first area of the screen overlapping the map. An example of the first area is shown in FIG. 5 through FIG. 9. The user interacts with the symbol in order to initiate the remaining changes to the display described with respect to the subsequent steps shown in FIG. 3.

Step 300 through step 306 need not be performed in the order shown. All four steps may be performed simultaneously, or may be performed in an order different from that shown.

At step 308, a determination is made whether the symbol of the waypoint displayed at step 306 has been selected by a user. Selection of the symbol may be by touching the symbol on a touch screen, or by some other means of user input such as voice, keyboard, or mouse. When a user selects a location on a map, an event is triggered to the operating system of the mobile device by a hardware controller. The operating system sends the event to the flight application. The hardware controller, operating system, and/or flight application may determine the location of the selection. The flight application may compare the location with the location of the symbol to determine that the symbol is selected.

If the symbol is not selected, then the process terminates. If the symbol is selected, then in response, at step 310, a first pop-up window is displayed in a second area of the screen overlapping the first area of the screen. The second area may overlap both the first area and the map. In this manner, available space on a limited screen size can still be presented prominently, but then removed when no longer useful. The first pop-up window in the second area displays a current time of arrival of the aircraft at the waypoint and further displays an input area configured to receive an input indicating an adjustment to the current time of arrival.

Optionally, at step 312, a determination may be made whether an adjustment to the desired time on target has been received via the user input in the second area of the screen. In this case, if no adjustment has been received, then the method may terminate. Alternatively, the method may loop back to itself at step 312 until the adjustment is received as input.

The method continues responsive to receiving the adjustment. Alternatively, the method continues either after or simultaneously with step 310. In any case, at step 314, a second pop-up window overlying the map is displayed in a third area of the screen. The second pop-up window displays a recommendation to perform one of: increase speed, maintain speed, and decrease speed to achieve the adjustment. The second pop-up window may further display a second recommendation that indicates a numerical value of a recommended speed change for the aircraft to achieve the adjustment. The second pop-up window may further display a current projected time of arrival at the waypoint, a ground speed required to reach the waypoint at an adjusted speed, and a time difference between the current projected time of arrival at the current speed and a predicted projected time of arrival at the recommended speed change.

Prior to displaying the second pop-up window at step 314, a flight application (e.g. flight application (214) of FIG. 2) executed by a processor (e.g. processor (202) of FIG. 2) may calculate the numerical value of the recommended speed change. The flight application may receive or retrieve position data from the global positioning system (e.g. global positioning system (206) of FIG. 2). The position data describes the position of the aircraft with respect to the Earth. The flight application may also receive or retrieve weather data from third-party weather reporting systems via a communication interface (e.g. communication interface (208) of FIG. 2). The weather data may include wind speeds at various altitudes, storm information, and the like. The flight application may also receive or retrieve flight planning instructions data from a regulatory agency or from a supervisory entity of an aircraft operator, such as, for example, requirements to arrive at certain waypoints at certain times or to avoid certain waypoints at certain times. The flight application may also retrieve or receive the user-defined changes to the desired arrival time, as described above. The flight application may also retrieve or receive other types of data from one or more, possibly different, sources of data. The flight planning application retrieves one or more of the data or information types described above and, when executed by the processor, calculates the speed change needed to achieve the desired arrival time while factoring in some or all of the data described above.

For example, assume that the user desires to arrive at a waypoint five minutes earlier. The user uses the user input area displayed by flight application to adjust the desired arrival time. The flight application also takes into account that wind speeds along the route to the waypoint increase by thirty knots, against the direction of aircraft travel, after the aircraft has traveled fifty miles. The flight application also takes into account that the Federal Aviation Administration has ordered that the aircraft decrease altitude by 5000 feet for a 100 mile segment of the flight path, where the winds change again and the air density changes. The flight application also takes into account that the aircraft should navigate around a thunderstorm reported along the route to the waypoint. The flight application calculates the new speed needed to overcome the different wind speeds at different segments, the new altitude, the increased air density along the segment, the time required to descend to the segment and ascend after the segment, and the increased travel distance required to navigate around the storm, and yet to arrive at the waypoint at the desired time.

In addition to the above, the flight application may also display that the user change speeds at different times along the route to the waypoint, in order to both arrive at the waypoint and to also comply with any regulatory requirements. For example, the flight application could display an increased speed of 50 knots is needed until a virtual waypoint is reached, and then to decrease speed by 60 knots after the virtual waypoint until the final waypoint is reached. A virtual waypoint is a waypoint used for flight planning purposes by the flight application, but is not displayed on the graphical user interface. Such multi-stage speed changes might be desirable when, for example, the Federal Aviation Administration has ordered that the aircraft not be in the vicinity of the virtual waypoint during a given time window, but that the user still desires to arrive at the final waypoint at the desired time.

Returning to displaying the second pop-up window at step 314, in either or both of the second area and the third area, map symbols and text may be displayed using a font size that is larger than the font sizes and map symbols used on the map or in the first area. In this manner, the important information that the user seeks is displayed more prominently and is displayed in a manner easier for the user to view. Once the user is finished with the information, the pop-up overlays of the second and third areas may be removed so that the user again only sees the map.

Figure 4:
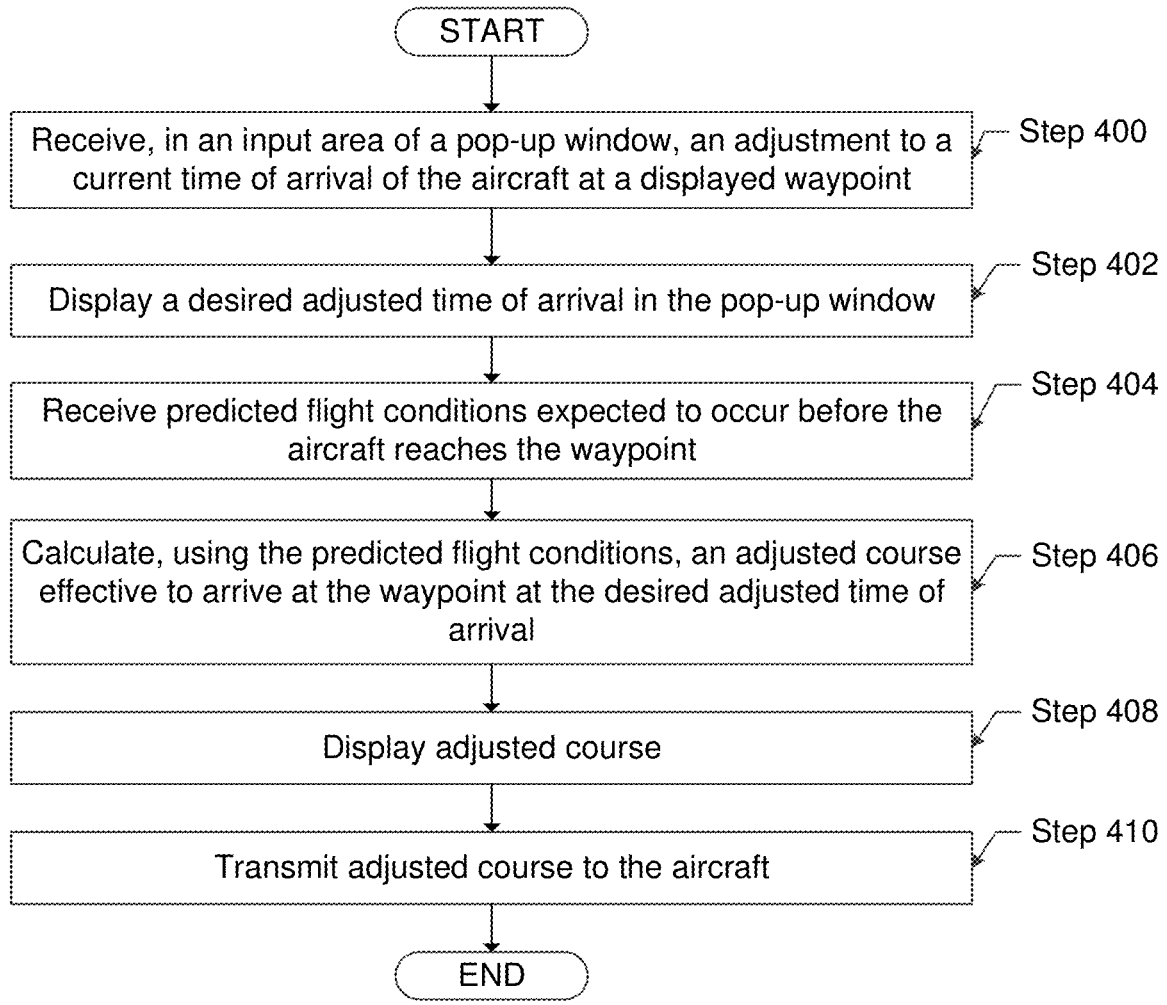

FIG. 4 shows a flowchart, in accordance with one or more embodiments. The method shown in FIG. 4 may be executed by a mobile device using a flight application, such as mobile device (200) and flight application (214) shown in FIG. 2. The method shown in FIG. 4 may also be executed by the devices shown in FIG. 10A and FIG. 10B. The method shown in FIG. 4 may be characterized as a method of displaying, on a screen of a mobile device, a course adjustment to an aircraft in flight.

At step 400, the mobile device receives, in an input area of a pop-up window overlying a map that displays a current location of the aircraft in flight, an adjustment to a current time of arrival of the aircraft at a waypoint displayed in the pop-up window. The adjustment may be received, for example, by adjusting scroll wheels displayed on a touch screen, as shown in FIG. 1 or FIG. 5 through FIG. 9. However, the adjustment may also be received via some other user input mechanism, such as a mouse, a keyboard, or voice activation.

At step 402, the mobile device displays a desired adjusted time of arrival in the pop-up window based on the adjustment. Alternatively, or in addition, the mobile device may display the desired adjusted time of arrival in a second pop-up window, as described with respect to FIG. 1.

At step 404, the mobile device receives predicted flight conditions expected to occur before the aircraft reaches the waypoint. As indicated above, the predicted flight conditions may be winds aloft, other weather information, speed changes necessary for ascent or descent, and the like. The predicted flight conditions may be received from a non-transitory computer readable storage medium of the mobile device, or may be downloaded or retrieved from on-board systems of the aircraft.

At step 406, the mobile device calculates, using the predicted flight conditions, an adjusted course effective to arrive at the waypoint at the desired adjusted time of arrival. The calculations may be performed by the processor by predicting how winds aloft, weather conditions, course changes, or necessary speed changes during ascent and descent will affect the speed or path of the aircraft. In this manner, the net time projected at the waypoint or the destination may be accurately predicted, assuming that further changes to the defined parameters do not occur. The one or more embodiments contemplate continuously updating the projected time on target, and alerting the user if further speed or course changes will be required to achieve the desired time on target.

At step 408, the mobile device displays the adjusted course. More specifically, the mobile device display the course and speed adjustments that the aircraft may make in order to achieve the desired time on target. Instructions for implementing the course and speed adjustments may be displayed in a second pop-up window displayed over the map and separated from the first pop-up window. This process is also described with respect to FIG. 2 and FIG. 3, and also shown in FIG. 5 through FIG. 9.

Optionally, at step 410, the mobile device may transmit the adjusted course to the aircraft. Accordingly, it may be possible for the one or more embodiments to cause the mobile device to automatically control operation of the aircraft to achieve the desired time on target, with oversight from the pilot.

The one or more embodiments contemplate variations from the examples described above. For example, the one or more embodiments contemplate that the display may not be a mobile device, but rather a display of an on-board computer of an aircraft or even a ground-based computer operated by a controller. However, in these cases, it still may be desirable to use the techniques described herein to display information prominently on displays that have limited screen size compared to conventional desktop monitors. The techniques described herein also help a user to clearly see and use information, even on larger desktop monitors. Thus, the one or more embodiments are not necessarily limited to use in mobile devices.

The one or more embodiments may also be used in a method for operating an aircraft. In this case, a mobile device receives an adjustment to a current time of arrival of the aircraft at a point. The mobile device is separate from the aircraft. Receiving is performed via an input area of a first pop-up window overlying a map that displays a current location of the aircraft in flight. The mobile device displays a desired adjusted time of arrival in the first pop-up window based on the adjustment. The mobile device also displays a second pop-up window overlying the map and separate from the first pop-up window. The second pop-up window displays a recommendation that the aircraft should adjust course to achieve the adjustment. The mobile device calculates an adjusted course effective to arrive at the point at the desired adjusted time of arrival. The mobile device may display the adjusted course, but also transmit a command to the aircraft to adjust a current course of the aircraft to match the adjusted course. The recommendation and the adjusted course both may be one of: a change in speed of the aircraft, a change in trajectory of the aircraft, and a combination of a change in the speed of the aircraft and the change in trajectory of the aircraft.

In an embodiment, the adjustment is received from a government regulatory agency. For example, the Federal Aviation Administration (FAA) may transmit instructions to a pilot to change the time on target for the pilot's aircraft. In this case, the pilot can use a mobile device to determine the course (including possibly speed) changes necessary to achieve the ordered time on target. The pilot can enter the necessary course adjustments to the aircraft, or the mobile device can transmit commands to the aircraft to change course accordingly.

FIG. 5, FIG. 6, FIG. 7, FIG. 8, and FIG. 9 show example depictions of a user interface in use, in accordance with one or more embodiments. FIG. 5 through FIG. 9 may be a series of screenshots of the UI of the one or more embodiments in use. However, while each of FIG. 5 through FIG. 9 may be described as a "screenshot," each figure is not necessarily an actual image from a user interface (UI). The information shown on the screenshots may be varied in alternative embodiments. Likewise, the exact positions, sizes, and shapes of overlays may vary in different embodiments. Nevertheless, the features of multiple overlays and the described interactions with the UI shown in FIG. 5 through FIG. 9 do represent one example of an operational UI in use. Because FIG. 5 through FIG. 9 should be read together as a whole, reference numerals common to FIG. 5 through FIG. 9 refer to similar objects with similar definitions.

Figure 5:
FIG. 5, FIG. 6, FIG. 7, FIG. 8, and FIG. 9 show depictions of a user interface in use, in accordance with one or more embodiments.

A first screenshot (500) of the UI shows a map (502) with many different ground features (e.g. the Huntsville International Airport (504) in Huntsville, Ala.), weather features (e.g. storm (506)), state boundaries (e.g. boundary 508 between the states of Alabama and Georgia), and a current location of the aircraft in flight (i.e., aircraft (510)). Various information may be displayed as an overlay on the map, such as a flight parameters bar (512) displayed across the bottom of the UI. Widgets may be displayed for use in interacting with the UI, including the widgets shown in a widget bar (514) and in a menu bar (516). A search input box (518) may be provided in case the user desires to perform a text search with respect to some aspect of use of the flight application. Concentric rings centered about the aircraft, such as ring (510A), ring (510B), and ring (510C) may indicate the time required to arrive at a ground location corresponding to a given ring at a current speed of the aircraft (510). The amount of time required to reach a point on the ring may be displayed together with the ring, as shown in FIG. 5 (e.g., 3 min, 6 min shown in FIG. 5).

Also displayed in the first screenshot (500) is a first area (520) of the screen. The first area (520) overlays the map. The first area (520) may include displays of a current speed and a current altitude of the aircraft, as well as other information including aircraft designation, distance to designated waypoint, estimated time of arrival, current fuel levels, wind speed, and other widgets for manipulating functions of the software program, such as but not limited to selection of new waypoints, routes, logs, profiles, and others.

In addition, the first area (520) shows a departure point (522), a waypoint (524) and a destination point (526) for the aircraft flight plan. In the embodiment shown in FIG. 5 through FIG. 9, each point is displayed as a three or four letter code which represents an airport. However, waypoints may be any point relative to the Earth and may be symbolized in different ways, such as by latitude and longitude, user-defined symbol, or any convenient alphanumeric code.

For the embodiment shown in FIG. 5 through FIG. 9, some or all of the departure point (522), the waypoint (524) and the destination point (526) are selectable. In response to selecting a point, a first pop-up window will be displayed in a second area of the screen that overlaps the first area (520) of the screen, and possibly also over a portion of the map (500).

Figure 6:

FIG. 6 shows a second screenshot (600) which demonstrates generation of an initial pop-up window (602) mentioned above. Again, the initial pop-up window (602) is generated in response to a user selecting the waypoint (524). Selection in this case is through touching the symbol for the waypoint (524) on a touchscreen device.

The initial pop-up window (602) may show a variety of information, but in the embodiment of FIG. 6, the initial pop-up window (602) shows a menu of possible requested actions. The requested actions may be to replace a waypoint, insert a waypoint before or after the current waypoint, insert a time to cross the waypoint, and other actions. In the embodiment shown in FIG. 6, the user selects the "time to cross ATL" sub-menu, which is the time to cross the currently designated waypoint. As shown in FIG. 6, the currently designated airport is "ATL" (i.e., the Atlanta International Airport).

The initial pop-up window (602) overlays part of the first area (520) of the screen. Thus, the initial pop-up window (602) also overlays the map. In the embodiment shown in FIG. 6, the initial pop-up window (602) overlays both the first area (520) of the screen and the map (500). The initial pop-up window (602) may be characterized as a second area of the screen.

Figure 7:

FIG. 7 shows a third screenshot (700) which demonstrates generation of a time-to-cross pop-up window (702) in response to selecting the "time to cross ATL" sub-menu shown in FIG. 6. In some embodiments, the time-to-cross pop-up window (702) may be generated directly in response to selection of the waypoint (524), and thus could be characterized as a "first pop-up window." In the case that the time-to-cross pop-up window (702) is displayed in response to selecting a sub-menu shown in the initial pop-up window (602) of FIG. 6, the time-to-cross pop-up window (702) may entirely replace the same screen area previously occupied by the initial pop-up window (602). Alternatively, the time-to-cross pop-up window (702) could be larger or smaller than the initial pop-up window (602).

The time-to-cross pop-up window (702) displays a current time of arrival of the aircraft at the waypoint at screen section (704). The time-to-cross pop-up window (702) also displays an input area (706) of the screen. The initial time setting of the input area (706) is set to the current time of arrival.

The input area (706) of the time-to-cross pop-up window (702) is configured to receive an input indicating an adjustment to the current time of arrival shown at screen section (704). In the example shown in FIG. 7, the input area (706) includes three scroll wheels adjustable by a user touching the screen and swiping up or down. The three scroll wheels include a date scroll wheel (708), an hour scroll wheel (710), and a minute scroll wheel (712). The current selections for the scroll wheels are highlighted and displayed in a row (711) of the input area (706) that is fixed relative to the input area (706).

Optionally, for when a twelve hour clock is in use, a fourth, a.m./p.m. scroll wheel (714) may be provided. In other embodiments, the input area (706) may take other forms, such as a dialog box, an analog clock, or other means for inputting an adjustment to the current time of arrival. In the example of FIG. 7, the user manipulates the scroll wheels by touching the screen to select a date and a time that constitutes an adjustment to the current time of arrival at the waypoint.

Note that FIG. 7 shows a means for adjusting a current time of arrival to a waypoint. However, the one or more embodiments contemplate that a similar adjustment may be made to the destination point, or to intervening waypoints. Thus, the one or more embodiments are not limited to the specific example shown in FIG. 7.

FIG. 8 shows a fourth screenshot (800) which demonstrates entry of user input to input area (706), together with generation of an instruction pop-up window (802) separate from the time-to-cross pop-up window (702). The instruction pop-up window (802) may be characterized as a "second pop-up window" in the case that the time-to-cross pop-up window (702) is the first pop-up window shown, as described with respect to FIG. 7.

In the embodiment shown in FIG. 8, the user has adjusted the minute scroll wheel (712) by advancing the current projected time of arrival at the waypoint to the desired projected time of arrival one minute later. In other words, while the current projected time of arrival at the waypoint is at 1:10 p.m., the user has indicated that the user would prefer to arrive at the waypoint at the later time of 1:11 p.m. (i.e., the adjustment to the current time of arrival).

In response, the mobile device calculates the course correction necessary to achieve the adjustment to the current time of arrival. Again, the term "course" may refer to the path the aircraft is taking, the speed of the aircraft, or both. The process of performing this calculation is described above with respect to FIG. 4.

After calculating the course correction necessary to achieve the adjustment to the current time of arrival, the mobile device is programmed to display the instruction pop-up window (802). The instruction pop-up window (802) displays the adjustment to the current time of arrival (804), a recommendation (806) to perform one of increase speed, maintain, speed, and decrease speed to achieve the adjustment, and a numerical value (808) of a recommended speed change for the aircraft to achieve the adjustment. The instruction pop-up window (802) may also include other information, such as but not limited to a required ground speed, a time to the waypoint, and a time change (delta) from the target.

The recommendation (806) and the numerical value (808) may be highlighted, displayed in a larger font size relative to other fonts displayed on the screen, or otherwise disposed to call the user's attention to the information. In the example shown, the font size of the recommendation (806) and the numerical value (808) have different font sizes, both of which are larger than other font sizes used in any other pop-up window. One or both of the font sizes may be larger than any other font size used on the screen.

In an embodiment, the amount of available screen space taken up by the combination of the time to cross pop-up window (702) and the instruction pop-up window (802) may be a significant percentage of the total available screen space. The term "significant" means sufficient to prominently display the information so as to call the user's attention to the user input and to the updated information, relative to all of the other information being displayed on the screen, particularly with respect to the map (500) and the first area (520). In an embodiment, as shown in FIG. 8, the term "significant" may be quantified to mean that combined areas of the time to cross pop-up window (702) and the instruction pop-up window (802) is at least twenty percent of the total screen space available to the mobile device.

In this manner, the information and input areas of most current relevance to the user are displayed, while still displaying all other information on the map (500) in areas of the screen that are not overlaid. Additionally, once the user is finished with the adjustment task, the pop-up windows may be closed such that the full detail of the map (500) is once again displayed without being at least partially obscured by an overlay. Thus, the one or more embodiments address the issue of displaying all desired information using a limited screen space available to a mobile device or using a non-mobile device which has a limited screen size.

Figure 9:

FIG. 9 shows a fifth screenshot (900) illustrating a further adjustment to the current time on target for the aircraft. As shown, the user may adjust the time of arrival in real time and see the required changes to course (including speed) in the instruction pop-up window (802). In particular, the user has changed the minute scroll wheel (804) in the input area (706) to indicate a time earlier than the current estimated time of arrival (specifically three minutes earlier). In response, the instruction pop-up window (802) changes, accordingly, the adjustment to the current time of arrival (804), the recommendation (806) to perform one of increase speed, maintain, speed, and decrease speed to achieve the adjustment, and the numerical value (808) of a recommended speed change for the aircraft to achieve the adjustment. In particular, the instruction pop-up window (802) indicates that the user should cause the aircraft to "go faster" by "26.0 kts" (26 knots, a measure of speed) in order for the aircraft to arrive at the waypoint at the adjusted predicted time of arrival.

Optionally, the color of the recommendation (806) and the numerical value (808) may change when the aircraft should increase speed relative to an instruction to decrease speed (as shown in FIG. 8). Highlighting schemes other than color may also be used, such as but not limited to font size or font type.

Figure 10A:
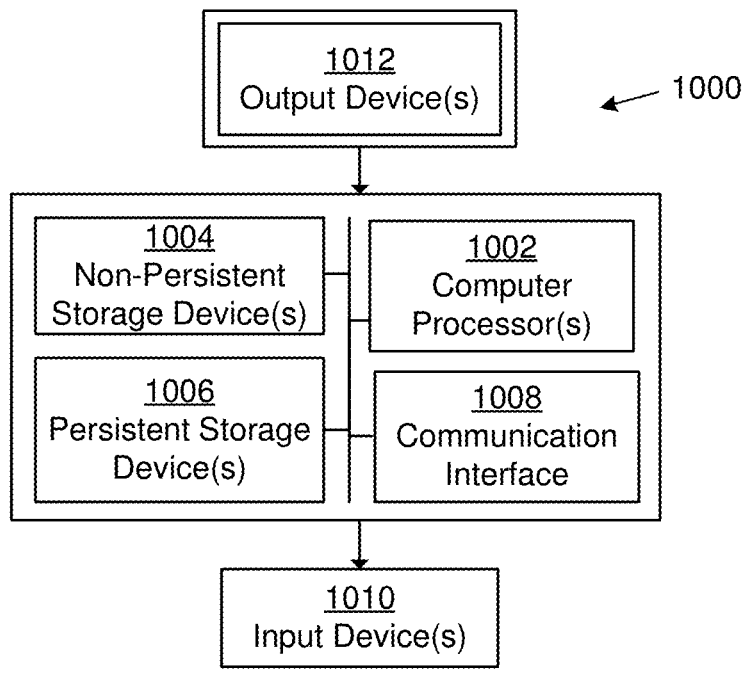
FIGS. 10A and 10B depicts a computer system and network in accordance with one or more embodiments

Embodiments of the invention may be implemented on a computing system. Any combination of mobile, desktop, server, router, switch, embedded device, or other types of hardware may be used. For example, as shown in FIG. 10A, the computing system (1000) may include one or more computer processors (1002), non-persistent storage device(s) (1004) (e.g., volatile memory, such as random access memory (RAM), cache memory), persistent storage device(s) (1006) (e.g., a hard disk, an optical drive such as a compact disk (CD) drive or digital versatile disk (DVD) drive, a flash memory, etc.), a communication interface (1008) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device.

The communication interface (1008) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1012), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage devices(s) (1004), and persistent storage device(s) (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 10B:
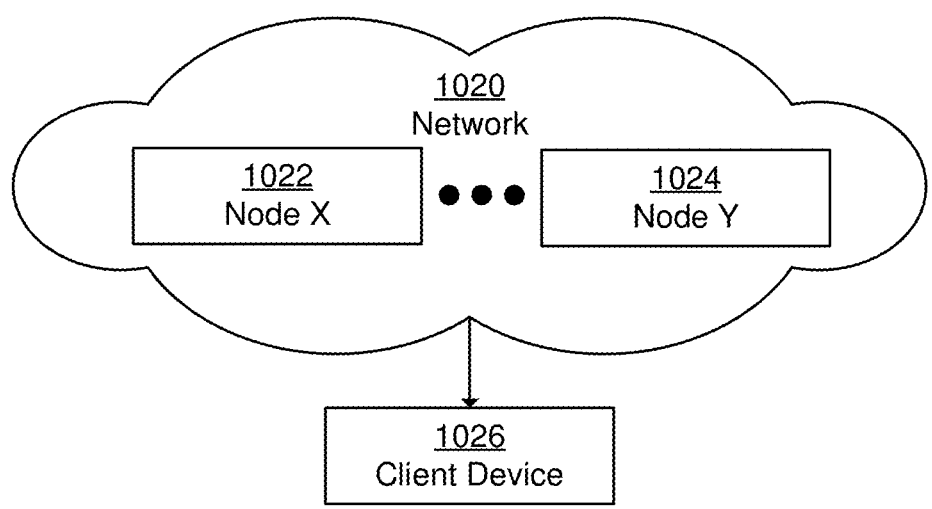

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1000) may be located at a remote location and connected to the other elements over a network.

Although not shown in FIG. 10B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10A. Further, the client device (1026) may include and/or perform all or a portion of one or more embodiments of the invention.

The computing system or group of computing systems described in FIGS. 10A and 10B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 10A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or a layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 10A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 10A and the nodes and/or client device in FIG. 10B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of displaying, on a screen of a mobile device, time on target information for an aircraft in flight, the method comprising:
    displaying, on the screen of the mobile device, a map of a portion of Earth including a plurality of ground locations;
    displaying, on the map, a current location of the aircraft;
    displaying, on the map, a waypoint for a planned flight path of the aircraft between a departure point and a destination point;
    displaying, in a first area of the screen overlapping the map, a symbol indicating the waypoint;
    displaying, responsive to a selection of the symbol, a first pop-up window in a second area of the screen overlapping the first area of the screen, wherein the first pop-up window displays a current time of arrival of the aircraft at the waypoint and further displays an input area comprising a widget configured to receive a user input of a user-provided adjustment to the current time of arrival, the user-provided adjustment being a direct change to the current time of arrival; and
    displaying, responsive to receiving the user input, a second pop-up window overlying the map in a third area of the screen, wherein the second pop-up window displays a recommendation to perform one of: increase speed, maintain speed, and decrease speed to achieve the user-provided adjustment, and wherein the second pop-up window further displays a second recommendation that indicates a numerical value of a recommended speed change for the aircraft to achieve the user-provided adjustment.

2. The method of claim 1, wherein:
    displaying is also responsive to selection of the symbol, map symbols are displayed using a first font size, and
    the first pop-up window and the second pop-up window are displayed using a second font size larger than the first font size.

3. The method of claim 2, wherein the second pop-up window is displayed using a third font size larger than the second font size.

4. The method of claim 1, wherein the user-provided adjustment to the current time of arrival comprises an unscheduled change to the current time of arrival.

5. The method of claim 1, wherein the map further displays a plurality of concentric rings with the aircraft at a center of the plurality of concentric rings, and wherein each of the plurality of concentric rings comprises a label showing a corresponding time to reach a location on a corresponding ring, from the current location of the aircraft.

6. The method of claim 1, further comprising:
    displaying a current speed and a current altitude of the aircraft in the first area of the screen.

7. The method of claim 6, further comprising:
    further displaying, in the second pop-up window, a current projected time of arrival at the waypoint, a ground speed required to reach the waypoint at an adjusted speed, and a time difference between the current projected time of arrival at the current speed and a predicted projected time of arrival at the recommended speed change.

8. The method of claim 1, wherein the widget comprises a plurality of scroll wheels selectable by touch on the screen, the plurality of scroll wheels independently operable and comprising displays of:
    a date of the user-provided adjustment of the current time of arrival;
    an hour of the user-provided adjustment of the current time of arrival; and
    a minute of the user-provided adjustment of the current time of arrival.

9. A method of displaying, on a screen of a mobile device, a course adjustment to an aircraft, the method comprising:
    receiving, by the mobile device and in a widget of an input area of a first pop-up window overlying a map that displays a current location of the aircraft in flight, a user-provided adjustment to a current time of arrival of the aircraft at a waypoint displayed in the first pop-up window, the user-provided adjustment being a direct change to the current time of arrival;
    displaying a desired adjusted time of arrival in the first pop-up window corresponding to the user-provided adjustment;
    receiving, in the mobile device, predicted flight conditions expected to occur before the aircraft reaches the waypoint;
    calculating, using the predicted flight conditions, an adjusted course effective to arrive at the waypoint at the desired adjusted time of arrival;
    displaying, a second pop-up window overlying the map in a second area of the screen, wherein the second pop-up window displays a recommendation to perform one of: increase speed, maintain speed, and decrease speed to achieve the user-provided adjustment, and wherein the second pop-up window further displays a second recommendation that indicates a numerical value of a recommended speed change for the aircraft to achieve the user-provided adjustment; and
    displaying the adjusted course.

10. The method of claim 9, wherein the adjusted course comprises one of a change in speed of the aircraft, a change in trajectory of the aircraft, and a combination of a change in the speed of the aircraft and the change in trajectory of the aircraft.

11. The method of claim 9, wherein the predicted flight conditions are selected from the group consisting of:
- winds aloft between the current location of the aircraft and the waypoint;
- weather patterns between the current location of the aircraft and the waypoint;
- ascents of the aircraft between the current location of the aircraft and the waypoint;
- descents of the aircraft between the current location of the aircraft and the waypoint; and
- combinations thereof.

12. The method of claim 11, further comprising:
displaying the predicted flight conditions on the map.

13. The method of claim 9, further comprising:
transmitting, by the mobile device to the aircraft, the adjusted course.

14. The method of claim 9, further comprising:
displaying, an instruction to implement the adjusted course.

15. A non-transitory computer readable storage medium comprising computer readable program code, the computer readable program code for causing a computer system to implement a method of displaying, on a screen connected to a computing device, a course adjustment to an aircraft, the computer readable program code for further causing the computer system to:
- receive, by the computing device and in a widget of an input area of a first pop-up window overlying a map that displays a current location of the aircraft in flight, a user-provided adjustment to a current time of arrival of the aircraft at a waypoint displayed in the first pop-up window, the user-provided adjustment being a direct change to the current time of arrival;
- display a desired adjusted time of arrival in the first pop-up window corresponding to the user-provided adjustment;
- receive, in the computing device, predicted flight conditions expected to occur before the aircraft reaches the waypoint;
- calculate, using the predicted flight conditions, an adjusted course effective to arrive at the waypoint at the desired adjusted time of arrival;
- display, a second pop-up window overlying the map in a second area of the screen, wherein the second pop-up window displays a recommendation to perform one of: increase speed, maintain speed, and decrease speed to achieve the user-provided adjustment, and wherein the second pop-up window further displays a second recommendation that indicates a numerical value of a recommended speed change for the aircraft to achieve the user-provided adjustment; and
- display the adjusted course.

16. The non-transitory computer readable storage medium of claim 15, wherein the adjusted course comprises one of a change in speed of the aircraft, a change in trajectory of the aircraft, and a combination of a change in the speed of the aircraft and the change in trajectory of the aircraft.

17. The non-transitory computer readable storage medium of claim 15, wherein the predicted flight conditions are selected from the group consisting of:
- winds aloft between the current location of the aircraft and the waypoint;
- weather patterns between the current location of the aircraft and the waypoint;
- ascents of the aircraft between the current location of the aircraft and the waypoint;
- descents of the aircraft between the current location of the aircraft and the waypoint; and
- combinations thereof.

18. The non-transitory computer readable storage medium of claim 17, wherein the computer readable program code further comprises code for causing the computer system to:
display the predicted flight conditions on the map.

19. The non-transitory computer readable storage medium of claim 15, wherein the computer readable program code further comprises code for causing the computer system to:
transmit, by the computing device to the aircraft, the adjusted course.

20. The non-transitory computer readable storage medium of claim 15, wherein the computer readable program code further comprises code for causing the computer system to:
display an instruction to implement the adjusted course.

* * * * *